United States Patent
Cui et al.

(10) Patent No.: US 12,187,632 B2
(45) Date of Patent: Jan. 7, 2025

(54) METHOD FOR ENHANCING DENITRIFICATION OF SEWAGE WITH LOW CARBON-TO-NITROGEN RATIO BY USING ELECTRODE BIOCARRIER

(71) Applicant: Beijing University of Technology, Beijing (CN)

(72) Inventors: Dan Cui, Beijing (CN); Chen Lu, Beijing (CN); Zi'en Tang, Beijing (CN)

(73) Assignee: Beijing University of Technology, Beijing (CN)

( * ) Notice: Subject to any disclaimer, the term of this patent is extended or adjusted under 35 U.S.C. 154(b) by 72 days.

(21) Appl. No.: 17/766,175

(22) PCT Filed: Oct. 29, 2021

(86) PCT No.: PCT/CN2021/127456
§ 371 (c)(1),
(2) Date: Apr. 1, 2022

(87) PCT Pub. No.: WO2022/121550
PCT Pub. Date: Jun. 16, 2022

(65) Prior Publication Data
US 2023/0331603 A1     Oct. 19, 2023

(30) Foreign Application Priority Data
Dec. 12, 2020   (CN) .......................... 202011468327.3

(51) Int. Cl.
C02F 3/00     (2023.01)
C02F 3/28     (2023.01)
(Continued)

(52) U.S. Cl.
CPC .............. *C02F 3/005* (2013.01); *C02F 3/006* (2013.01); *C02F 3/282* (2013.01);
(Continued)

(58) Field of Classification Search
CPC .......... C02F 3/005; C02F 3/006; C02F 3/282; C02F 2101/163; C02F 2101/30;
(Continued)

(56) References Cited

FOREIGN PATENT DOCUMENTS

| CN | 105906051 | 8/2016 |
|----|-----------|--------|
| CN | 109292959 | 2/2019 |

(Continued)

OTHER PUBLICATIONS

Chinese communication, with English translation, dated Jul. 26, 2022 in corresponding Chinese patent application No. 202011468327.3.

(Continued)

*Primary Examiner* — Madeline Gonzalez
(74) *Attorney, Agent, or Firm* — Nields, Lemack & Frame, LLC

(57) ABSTRACT

The disclosure discloses a method for enhancing denitrification of sewage with a low carbon-to-nitrogen ratio by using an electrode biocarrier, and relates to the field of sewage treatment. The disclosure uses a conductive material as a microbial carrier and a potentiostat to induce a micro-electric field for directional acclimation and enrichment of electroactive denitrification microorganisms, and realizes a high-efficiency denitrification of the sewage with a low carbon-to-nitrogen ratio. The disclosure aims to provide a technical method for solving the problem of deep denitrification of municipal sewage with a low carbon-to-nitrogen ratio.

6 Claims, 3 Drawing Sheets

(51) Int. Cl.
 *C02F 101/16* (2006.01)
 *C02F 101/30* (2006.01)
(52) U.S. Cl.
 CPC .... *C02F 2101/163* (2013.01); *C02F 2101/30* (2013.01); *C02F 2303/10* (2013.01)
(58) Field of Classification Search
 CPC .............. C02F 2303/10; C02F 1/46109; C02F 2001/46133; C02F 2101/16; C02F 2201/46115; C02F 2201/46135; C02F 2305/06; Y02W 10/10
 USPC ... 210/630, 660, 681, 748.17, 903, 638, 651
 See application file for complete search history.

(56) References Cited

FOREIGN PATENT DOCUMENTS

| CN | 110002578 | 7/2019 | |
|---|---|---|---|
| CN | 112694166 | 4/2021 | |
| JP | 2011182786 | 9/2011 | |
| WO | 2014082989 | 6/2014 | |
| WO | WO-2014082989 A1 * | 6/2014 | .............. C02F 3/005 |

OTHER PUBLICATIONS

Chinese communication, with English translation, dated Oct. 10, 2022 in corresponding Chinese patent application No. 202011468327.3.
International Search Report for International Application No. PCT/CN2021/127456 dated Feb. 9, 2022.

* cited by examiner

METHOD FOR ENHANCING DENITRIFICATION OF SEWAGE WITH LOW CARBON-TO-NITROGEN RATIO BY USING ELECTRODE BIOCARRIER

CROSS REFERENCE TO RELATED APPLICATION(S)

This patent application claims the benefit and priority of Chinese Patent Application No. 202011468327.3 filed on Dec. 12, 2020, the disclosure of which is incorporated by reference herein in its entirety as part of the present application.

TECHNICAL FIELD

The present disclosure relates to the technical field of sewage treatment, and specifically relates to a method for enhancing deep denitrification of sewage with a low carbon-to-nitrogen ratio by using an electrode biocarrier.

BACKGROUND ART

With the acceleration of China's urbanization and population growth, the discharge amount of municipal domestic sewage is increasing, and water pollution is also becoming more and more serious. Nitrate pollution has been concerned from all walks of life. Nitrate would not only cause eutrophication of water, but also can be reduced to nitrite when entering into human body. And nitrite may be converted into nitrosamines which have carcinogenic and teratogenic effects. Therefore, the effective removal of nitrate is of great significance for improving the water environment and protecting human life and health. The traditional heterotrophic denitrification process is highly dependent on organic carbon sources, resulting in that the treatment cost of municipal domestic sewage with a low carbon-to-nitrogen ratio is relatively high. Aiming to the deep denitrification of municipal domestic sewage with a low carbon-to-nitrogen ratio, it is particularly important to develop a novel energy-saving and high-efficiency biological denitrification technology.

In recent years, the rapid development of bio-electrochemical systems (BESs) has provided new ideas and new methods for breaking through the technical bottleneck of sewage denitrification process. The BESs use electroactive microorganisms as catalysts to achieve a pollutant removal and an energy and resource recovery. Electrode is a key component of the BESs and a carrier for the attachment of electroactive microorganisms. The process of extracellular electron transfer between electroactive microorganisms and electrode could greatly accelerate a reaction. In 2004, Gregory et al. discovered that Geobacter microorganisms have the ability to capture electrons directly from an electrode in the BESs. Therefore, a high-efficiency denitrification could be achieved by using an electrode as an electron donor and a nitrate with a high standard redox potential of +0.433 V vs SHE as an electron acceptor through the mediation of electroactive microorganisms. Subsequent studies have shown that in addition to the Geobacter microorganisms, a mixed-culture or pure-culture biofilm including *Thiobacillus denitrifcans, Pseudomonas alcaliphila, Pseudomonas aeruginosa* and the like could use electrons from an electrode for denitrification. Electroactive bacterial flora using electrode as an electron donor is widespread in nature and easy to be enriched and domesticated. In the denitrification process, when there is a carbon source, the electrode biocarrier could generate electricity while reducing nitrate nitrogen; when the carbon source is depleted, the electrode acts as an electron donor for autotrophic denitrification of the electrode. Therefore, the electrode biocarrier may effectively reduce the dependence on the externally-applied carbon source. In addition, through the real-time information of the current and the potential, the removal of organic matter and the activity of microorganisms could be monitored, which is conductive to enhancing the control of the system. More importantly, the electrode biocarrier has characteristics of short start-up time and high sustainability.

SUMMARY

The present disclosure is to achieve deep denitrification of sewage with a low carbon-to-nitrogen ratio by using an electrode biocarrier.

The present disclosure provides a method for denitrification of sewage with a low carbon-to-nitrogen ratio by using an electrode biocarrier, comprising the following steps:

(I) Acclimation of an Electrode Biocarrier (1) Spatial Configuration and Pretreatment of an Electrode using a carbon-based material or a metal material as a working electrode; firstly, soaking the electrode with acetone for 24 h to remove organic impurities on a surface of the electrode, and then washing and drying the electrode for later use, wherein the electrode may be configured to have a two-dimensional planar structure or a three-dimensional structure, and the three-dimensional structure may be a graphite rod structure, a carbon fiber brush structure, a carbon-based layer stacked structure or a sheet metal layer stacked structure;

(2) Enrichment of an Electroactive Denitrification Biofilm using an activated sludge (with a concentration of 0.2-1.0 g/L, and collected from a secondary clarifier) as an inoculum, and adopting a three-electrode electrochemical reactor with the electrode biocarrier obtained in step (1) as a working electrode and a carbon-based material or a metal material as a counter electrode, wherein the working electrode and the counter electrode are separated by an ion-exchange membrane which is a cation exchange membrane or a proton exchange membrane; placing silver/silver chloride (Ag/AgCl) as a reference electrode in the three-electrode electrochemical reactor, controlling an environment in a working electrode chamber to be anaerobic, while an environment in a counter electrode chamber being not controlled; applying voltage by a direct-current power supply or inducing a micro electric field by a potentiostat to control potential of the working electrode in a range of −0.2 V to −0.7 V; and feeding with an artificial wastewater adding carbon source but without nitrate during a start-up phase, and operating the three-electrode electrochemical reactor in a sequential batch mode until a current changes periodically and steadily for 4 or more cycles, and then adding a sewage with a low carbon-to-nitrogen ratio until a stable operation;

wherein the pure carbon source added during the start-up phase is a volatile organic acid, such as formic acid and acetic acid;

wherein the sewage with a low carbon-to-nitrogen ratio has real domestic sewage or simulated artificial water as a substrate; a carbon source in the substrate may be a volatile organic acid, such as formic acid and acetic acid, or other biodegradable organic matter, and a nitrogen source in the substrate is nitrate nitrogen; the carbon-to-nitrogen ratio of the substrate is controlled to be less than or equal to 5;

wherein an organic matter oxidation and a denitrification are occurred in the working electrode chamber, and reactions occurred on the counter electrode may be but not limited to any reduction reaction such as hydrogen production, oxygen reduction and iron reduction;

wherein the working electrode chamber may work in a sequential batch mode or a continuous flow mode; when a nitrogen removal rate in the substrate is 90%, and an output current changes periodically or remains unchanged, it is considered that the enrichment of the electroactive denitrification biofilm is completed; and (II) Control of Deep Denitrification of the Sewage with a Low Carbon-to-Nitrogen Ratio after the acclimation of the electrode biocarrier, controlling the carbon-to-nitrogen ratio (C/N) in the working electrode chamber to be less than or equal to 5 while the potential of the working electrode may be controlled in the range of −0.2 V to −0.7 V.

When there is an organic carbon source in an early stage of the reaction, an organic matter oxidation and a heterotrophic denitrification are occurred on the electrode biocarrier, the organic matter oxidation and the heterotrophic denitrification including an organic matter degradation, a heterotrophic denitrification with the organic carbon source as an electron donor, and an electricity generation. When the organic carbon source is completely consumed in a later stage, an autotrophic denitrification with the electrode as the electron donor is occurred on the electrode biocarrier. When the three-electrode electrochemical reactor operates in the sequential batch mode and the current changes periodically and remains unchanged for more than 4 consecutive cycles, it is considered that the three-electrode electrochemical reactor starts up successfully and could operate steadily. When the three-electrode electrochemical reactor operates in the continuous flow mode and the current remains unchanged for more than 48 h, it is considered that the three-electrode electrochemical reactor starts up successfully and could operate steadily.

The carbon-based material is a carbon material, a graphite material, or a graphene material; and the metal material is a corrosion-resistant material, such as stainless steel and titanium.

The method according to the present disclosure may be used for an advanced treatment of municipal domestic sewage or industrial wastewater with a low carbon-to-nitrogen ratio, and could be coupled to a denitrification process of sewage treatment plant as an auxiliary unit.

As mentioned above, the present disclosure has the following characteristics:

(1) the heterotrophic denitrification process and the autotrophic denitrification process are coupled in order to simultaneously remove nitrate and organic matter from the sewage with a low carbon-to-nitrogen ratio while recovering electric energy;

(2) the present disclosure makes it possible to efficiently remove nitrate nitrogen, and reduce the generation of intermediate products, such as nitrite and nitrous oxide;

(3) compared with a traditional biological denitrification process, the electrode biocarrier has a fast start-up speed, high stability and high denitrification efficiency; and (4) through the real-time information of the current and the potential, the removal of pollutants and the activity of microorganisms could be monitored, and thereby the system is easy to realize an automatic control.

DETAILED DESCRIPTION OF THE EMBODIMENTS

The present disclosure will be further described below in conjunction with examples, but the present disclosure is not limited to the following examples.

Example 1

Figure 1:
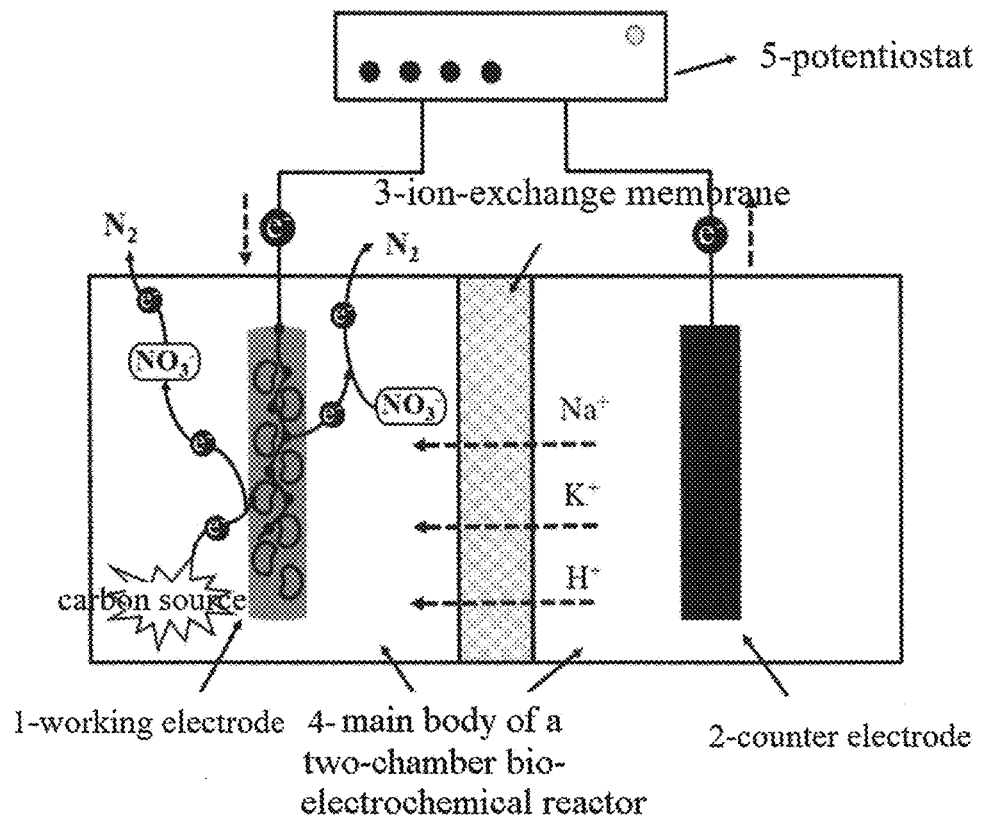
FIG. 1 is a schematic diagram of an electrode biocarrier.
Figure 2:
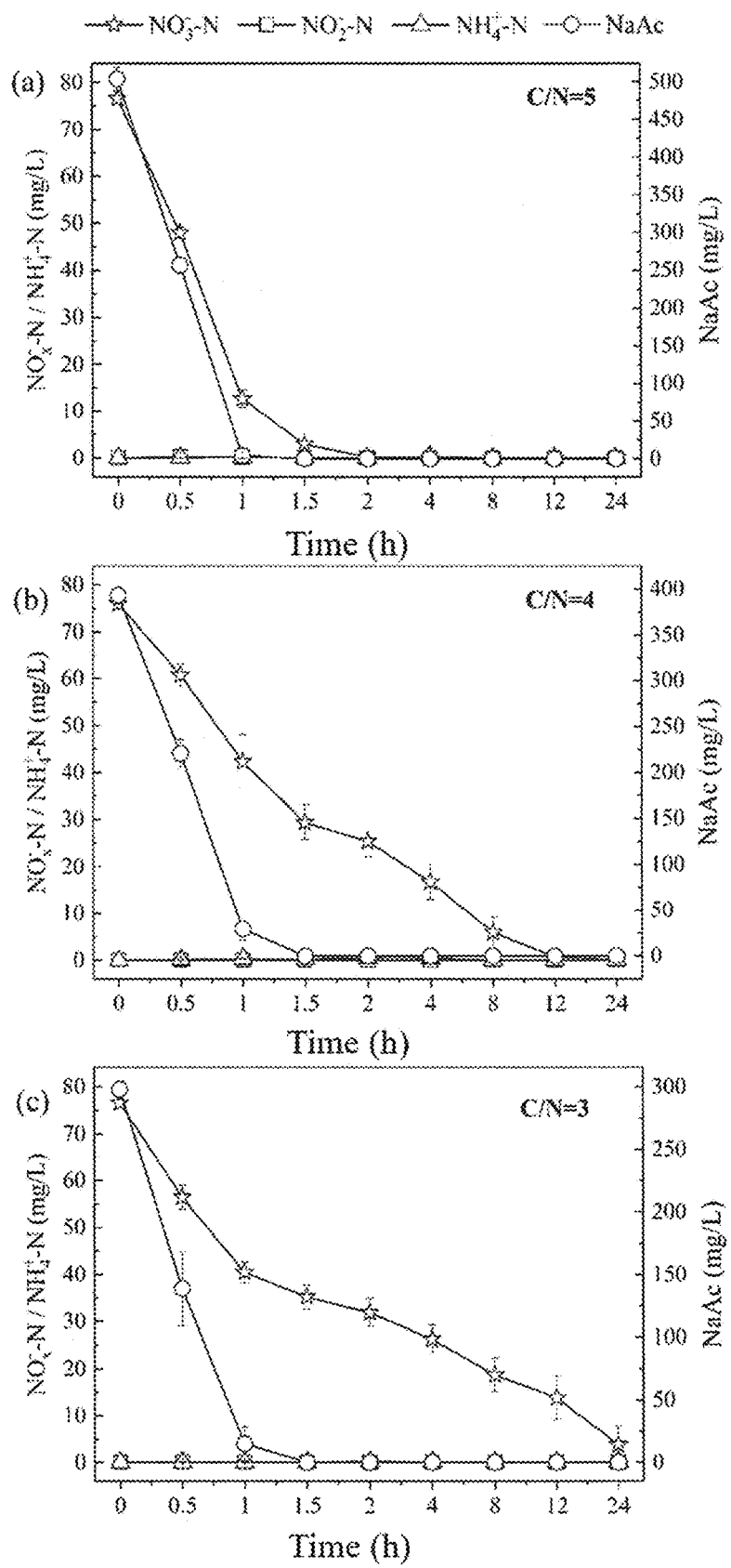
FIG. 2 shows changes of nitrogen and sodium acetate over time under the following conditions: (a) a carbon-to-nitrogen ratio being 5; (b) a carbon-to-nitrogen ratio being 4; and (c) a carbon-to-nitrogen ratio being 3.

(1) Denitrification Efficiency of the Electrode Biocarrier in Treatment of Sewage with Different Carbon-to-Nitrogen Ratios In this example, a two-chamber bio-electrochemical reactor was used, a carbon fiber brush was selected as a carrier (a working electrode) of the microorganisms, and a carbon rod was selected as the electrode material of counter electrode. The two chambers were separated by a cation exchange membrane, and Ag/AgCl was selected as a reference electrode. Effective working volumes of anode chamber and cathode chamber were 80 mL and 90 mL, respectively. The working electrode was inoculated with an activated sludge (0.5 g/L), and the working potential was constant at −0.2 V vs Ag/AgCl. During the start-up phase, 0.5 g/l of sodium acetate was used as a carbon source, and the bio-electrochemical reactor operated in a sequential batch mode until the current changes periodically and stably for 4 or more cycles. Subsequently, nitrate nitrogen ($NO_3^-$—N) was added to the system and the carbon-to-nitrogen ratio was controlled to be 5, 4, and 3, respectively. Experimental data was collected after stably operating for 6 cycles with each carbon-to-nitrogen ratio. As shown in FIG. 2, with the three carbon-to-nitrogen ratios of 5, 4 and 3, the removal efficiency of nitrate nitrogen reaches 95% within 24 h, and the average removal rate of nitrate nitrogen is 1.178 kg $N/m^3 \cdot d$, 0.21 kg $N/m^3 \cdot d$ and 0.02 kg $N/m^3 \cdot d$, respectively. There was no ammonia nitrogen and nitrite (as an intermediate product) formed (with the final nitrogen product being nitrogen gas) under the three conditions. The above results indicate that the method could achieve a high-efficiency denitrification of sewage with a low carbon-to-nitrogen ratio. Illumina 16r RNA high-throughput sequencing was used to detect the structure of microbial flora on the electrode biocarrier. The results show that there are *Thaurea*, *Acidovorax* and *Chryseobacterium* with denitrification function as the main functional bacteria on the electrode biocarrier, and the existing microorganisms with capacity of generating electricity are mainly Geobacter, *Bacteroides* and *Rhodopseudomonas*.

Figure 3:
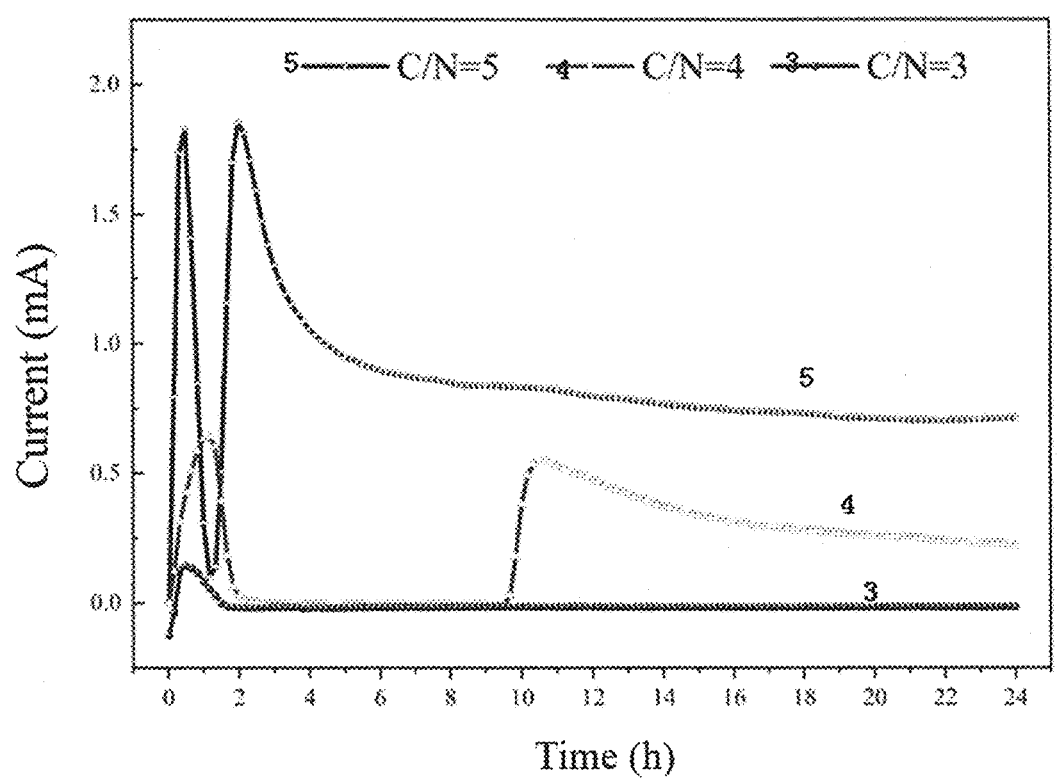
FIG. 3 is a schematic diagram of output current changes under different carbon-to-nitrogen ratios.

(2) Electricity Generation Efficiency of the Electrode Biocarrier in Treatment of Sewage with Different Carbon-to-Nitrogen Ratios FIG. 3 shows the electricity generation under different carbon-to-nitrogen ratios in one cycle (24 h) operated in a sequential batch mode after stably reacting under the carbon-to-nitrogen ratios. It can be seen from FIG. 3 that current changes at all carbon-to-nitrogen ratios, indicating that the electrode biocarrier could realize electric energy recovery even at a low carbon-to-nitrogen ratio. The peak currents under carbon-to-nitrogen ratios of 5, 4 and 3 are 1.96±0.12 mA, 0.58±0.07 mA and 0.15±0.01 mA, respectively.

When the carbon-to-nitrogen ratio is 5, there are two peak currents in the current curve. At 0-0.5 h, the reaction just starts, sodium acetate is sufficient for denitrification and electricity generation, and thus the current rises. Then, the current drops (at 0.5-1 h). After half of sodium acetate is consumed, denitrification gradually becomes dominant in competing electrons, and the current drops until to 0. When the current drops to 0, the denitrification rate reaches its maximum. At 1-2 h, the current rises again, sodium acetate and nitrate nitrogen in the solution are almost degraded at the same time, and the remaining nitrogen is removed by an internal carbon source stored by the microorganisms. At this time, the electrode acts as an electron acceptor to generate electricity, and the current rises. Finally, nitrate nitrogen is completely removed, and the microorganisms use the electrode as the only electron acceptor for metabolic activities, and the current of the system slowly drops and stabilizes at 0.8 mA.

When the carbon-to-nitrogen ratio is 4, sodium acetate is sufficient at 0-1 h for denitrification and electricity generation, and thus the current rises. As the concentration of sodium acetate decreases, the current value is lower than that when the carbon-to-nitrogen ratio is 5. At 1-2 h, after sodium acetate in the solution is degraded, the electrode slowly converts from an electron acceptor to an electron donor, thus the current drops, and the degradation rate of nitrate nitrogen is also decreased. At 2-10.5 h, the microorganisms use an internal carbon source stored through sodium acetate to reduce nitrate nitrogen. At this time, the electrode still acts as an electron donor (a very small part, with the current of −0.008 mA), and the denitrification rate at this stage is the slowest. At 10.5-24 h, nitrate nitrogen is completely removed, and the microorganisms use the electrode as the only electron acceptor for metabolic activities, and the current of the system slowly drops and stabilizes at 0.3 mA.

When the carbon-to-nitrogen ratio is 3, sodium acetate is used for denitrification and electricity generation at 0-1 h, and thus the current rises. In the subsequent reaction, there is no sodium acetate, the electrode acts as an electron donor for autotrophic denitrification, and the current value gradually increases from −0.01 mA to −0.002 mA.

The above indicates that through the real-time information of the current and the potential, the removal of organic matter and the activity of microorganisms may be monitored, which is conductive to enhancing the control of the system

What is claimed is:

1. A method for enhancing denitrification of sewage with a low carbon-to-nitrogen ratio by using an electrode biocarrier, comprising the following steps:
   (I) acclimation of an electrode biocarrier
   (1) spatial configuration and pretreatment of an electrode using a carbon-based material or a metal material as an electrode; firstly, soaking the electrode with acetone for 24 h to remove organic impurities on a surface of the electrode, and then washing and drying the electrode for later use, wherein the electrode is configured to have a two-dimensional planar structure or a three-dimensional structure, and the three-dimensional structure is a graphite rod structure, a carbon fiber brush structure, a carbon-based layer stacked structure or a sheet metal layer stacked structure;
   (2) enrichment of an electroactive denitrification biofilm using an activated sludge as an inoculum, and adopting a three-electrode electrochemical reactor with the electrode obtained in step (1) as a working electrode and a carbon-based material or a metal material as a counter electrode, wherein the working electrode and the counter electrode are separated by an ion-exchange membrane, and the ion-exchange membrane is a cation exchange membrane or a proton exchange membrane; placing silver/silver chloride as a reference electrode in the three-electrode electrochemical reactor, controlling an environment in a working electrode chamber to be anaerobic, while an environment in a counter electrode chamber being not controlled; applying voltage by a direct-current power supply or inducing a micro electric field by a potentiostat to control potential of the working electrode in a range of −0.2 V to −0.7 V; and feeding with an artificial wastewater adding carbon source but without nitrate during a start-up phase, and operating the three-electrode electrochemical reactor in a sequential batch mode until a current changes periodically and steadily for 4 or more cycles, and then adding the sewage with a low carbon-to-nitrogen ratio until a stable operation;
   wherein the pure carbon source added during the start-up phase is a volatile organic acid;
   wherein the sewage with a low carbon-to-nitrogen ratio has real domestic sewage or simulated artificial water as a substrate; a carbon source in the substrate is a volatile organic acid or other biodegradable organic matter, and a nitrogen source in the substrate is nitrate nitrogen; the carbon-to-nitrogen ratio of the substrate is controlled to be less than or equal to 5;
   wherein the working electrode chamber works in a sequential batch mode or a continuous flow mode; under the condition that a nitrogen removal rate in the substrate is 90% and an output current changes periodically or remains unchanged, the enrichment of the electroactive denitrification biofilm is completed; and
   (II) control of deep denitrification of the sewage with a low carbon-to-nitrogen ratio
   after the acclimation of the electrode biocarrier, controlling the carbon-to-nitrogen ratio of the sewage in the working electrode chamber to be less than or equal to 5 and potential of the working electrode in the range of −0.2 V to −0.7 V.

2. The method for enhancing denitrification of sewage with a low carbon-to-nitrogen ratio by using an electrode biocarrier of claim 1, wherein a concentration of the activated sludge inoculated in step (I) is 0.2-1.0 g/L, and the activated sludge is an activated sludge from a secondary clarifier.

3. The method for enhancing denitrification of sewage with a low carbon-to-nitrogen ratio by using an electrode biocarrier of claim 1, wherein under the condition that there is an organic carbon source in an early stage of reaction, an organic matter oxidation and a heterotrophic denitrification are occurred on the electrode biocarrier, the organic matter oxidation and the heterotrophic denitrification comprising an organic matter degradation, a heterotrophic denitrification with the organic carbon source as an electron donor, and an electricity generation; under the condition that the organic carbon source is completely consumed in a later stage, an autotrophic denitrification with the electrode as an electron donor is occurred on the electrode biocarrier; under the condition that the three-electrode electrochemical reactor operates in the sequential batch mode and the current changes periodically and remains unchanged for 4 or more consecutive cycles, the three-electrode electrochemical reactor starts up successfully and operates steadily; under the condition that the three-electrode electrochemical reactor operates in the continuous flow mode and the current remains unchanged for not less than 48 h, the three-electrode electrochemical reactor starts up successfully and operates steadily.

4. The method for enhancing denitrification of sewage with a low carbon-to-nitrogen ratio by using an electrode biocarrier of claim 1, wherein the carbon-based material is a carbon material, a graphite material or a graphene material; and the metal material is a corrosion-resistant material.

5. The method for enhancing denitrification of sewage with a low carbon-to-nitrogen ratio by using an electrode biocarrier of claim 1, wherein the volatile organic acid is formic acid or acetic acid.

6. The method for enhancing denitrification of sewage with a low carbon-to-nitrogen ratio by using an electrode biocarrier of claim 4, wherein the corrosion-resistant material is stainless steel or titanium.

\* \* \* \* \*